(12) United States Patent
Bonk

(10) Patent No.: US 6,890,034 B2
(45) Date of Patent: May 10, 2005

(54) COMPACT RECLINER WITH LOCKING CAMS

(75) Inventor: Jeffery T. Bonk, Clinton Township, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/352,782

(22) Filed: Jan. 28, 2003

(65) Prior Publication Data

US 2004/0145226 A1 Jul. 29, 2004

(51) Int. Cl.⁷ .................................................. B60N 2/22
(52) U.S. Cl. ...................................................... 297/367
(58) Field of Search ................................ 297/367, 366, 297/378.12

(56) References Cited

U.S. PATENT DOCUMENTS

| | | |
|---|---|---|
| 775 A | 6/1838 | Carver |
| 289,653 A | 12/1883 | Haynes |
| 2,507,997 A | 5/1950 | Roedding et al. |
| 2,941,583 A | 6/1960 | Tischler et al. |
| 3,459,065 A | 8/1969 | Fender |
| 3,641,838 A | 2/1972 | Turner |
| 3,663,056 A | 5/1972 | Turner |
| 3,737,946 A | 6/1973 | Guiliani |
| 3,879,802 A | 4/1975 | Werner |
| 3,901,100 A | 8/1975 | Iida et al. |
| 4,076,309 A | 2/1978 | Chekirda et al. |
| 4,082,352 A | 4/1978 | Bales et al. |
| 4,085,969 A | 4/1978 | Nakane et al. |
| 4,087,885 A | 5/1978 | Gillentine |
| 4,103,970 A | 8/1978 | Homier |
| 4,133,578 A | 1/1979 | Fancy |
| 4,143,905 A | 3/1979 | Hensel et al. |
| 4,159,815 A | 7/1979 | Strowik et al. |
| 4,348,050 A | 9/1982 | Letournoux et al. |
| 4,591,207 A * | 5/1986 | Nithammer et al. ........ 297/366 |
| 4,709,965 A | 12/1987 | Kazaoka et al. |
| 4,765,680 A | 8/1988 | Kawashima |
| 4,767,158 A | 8/1988 | Satoh |
| 4,770,464 A | 9/1988 | Pipon et al. |
| 4,875,735 A | 10/1989 | Moyer et al. |
| 4,884,845 A | 12/1989 | Schmale et al. |
| 4,946,223 A | 8/1990 | Croft et al. |
| 4,995,669 A | 2/1991 | Croft |
| 4,997,223 A | 3/1991 | Croft |
| 5,150,632 A | 9/1992 | Hein |
| 5,161,856 A | 11/1992 | Nishino |
| 5,301,569 A | 4/1994 | Droulon |
| 5,507,553 A | 4/1996 | Nishizawa et al. |
| 5,558,402 A | 9/1996 | Yamada |
| 5,590,931 A | 1/1997 | Fourrey et al. |
| 5,611,599 A | 3/1997 | Baloche et al. |
| 5,622,407 A | 4/1997 | Yamada et al. |
| 5,632,525 A | 5/1997 | Uramichi |

(Continued)

FOREIGN PATENT DOCUMENTS

FR  2 578 602  9/1986

Primary Examiner—Peter R. Brown
(74) Attorney, Agent, or Firm—Harness, Dickey & Pierce, P.L.C.

(57) ABSTRACT

A compact recliner assembly includes a first housing half and a second housing half rotatably supported about the first housing half. A pawl is movable between a first position engaging the second housing half to prohibit rotation relative to the first housing half and a second position disengaging the second housing half to enable rotation relative to the first housing half. A release cam is rotatably supported by the first housing half and engages the pawl to move the pawl between the first and second positions. A first locking cam engages the release cam and is movable between a locked position locking the pawl in the first position and an unlocked position enabling the pawl to move to the second position.

44 Claims, 7 Drawing Sheets

U.S. PATENT DOCUMENTS

| | | | |
|---|---|---|---|
| 5,664,836 | A | 9/1997 | Takagi |
| 5,664,837 | A | 9/1997 | Takagi |
| 5,664,838 | A | 9/1997 | Baloche |
| 5,678,895 | A | 10/1997 | Matsuura et al. |
| 5,681,086 | A | 10/1997 | Baloche |
| 5,692,589 | A | 12/1997 | Beguin |
| 5,702,156 | A * | 12/1997 | Takagi ................. 297/367 |
| 5,709,133 | A | 1/1998 | Coggon et al. |
| 5,718,483 | A | 2/1998 | Yamaguchi et al. |
| 5,725,452 | A | 3/1998 | Droulon et al. |
| 5,749,624 | A | 5/1998 | Yoshida |
| 5,749,625 | A * | 5/1998 | Robinson ................. 297/367 |
| 5,755,491 | A | 5/1998 | Baloche et al. |
| 5,762,400 | A | 6/1998 | Okazaki et al. |
| 5,769,494 | A | 6/1998 | Barrere et al. |
| 5,779,313 | A | 7/1998 | Bohee |
| 5,785,386 | A | 7/1998 | Yoshida |
| 5,788,325 | A | 8/1998 | Ganot |
| 5,813,724 | A | 9/1998 | Matsuura et al. |
| 5,816,656 | A | 10/1998 | Hoshihara et al. |
| 5,820,218 | A | 10/1998 | Baloche et al. |
| 5,820,219 | A | 10/1998 | Rohee |
| 5,857,746 | A | 1/1999 | Barrere et al. |
| 5,871,414 | A | 2/1999 | Voss et al. |
| 5,873,630 | A | 2/1999 | Yoshida et al. |
| 5,881,854 | A | 3/1999 | Rougnon-Glasson |
| 5,884,972 | A | 3/1999 | Deptolla |
| 5,934,753 | A | 8/1999 | Lange |
| 5,984,413 | A | 11/1999 | Baloche et al. |
| 5,997,090 | A | 12/1999 | Baloche et al. |
| 6,003,945 | A | 12/1999 | Kojima |
| 6,007,152 | A | 12/1999 | Kojima et al. |
| 6,007,153 | A | 12/1999 | Benoit et al. |
| 6,019,430 | A | 2/2000 | Magyar et al. |
| 6,023,994 | A | 2/2000 | Yoshida |
| 6,039,400 | A | 3/2000 | Yoshida et al. |
| 6,082,821 | A | 7/2000 | Baloche et al. |
| 6,085,386 | A | 7/2000 | Blanchard et al. |
| 6,092,874 | A | 7/2000 | Kojima et al. |
| 6,095,608 | A | 8/2000 | Ganot et al. |
| 6,102,480 | A | 8/2000 | Asano |
| 6,112,370 | A | 9/2000 | Blanchard et al. |
| 6,120,098 | A | 9/2000 | Magyar et al. |
| 6,142,569 | A | 11/2000 | Kidokoro et al. |
| 6,149,235 | A | 11/2000 | Fahim |
| 6,164,723 | A | 12/2000 | Ganot |
| 6,178,596 | B1 | 1/2001 | Choi |
| 6,220,666 | B1 | 4/2001 | Ohya |
| 6,224,157 | B1 | 5/2001 | Di Luccio |
| 6,253,894 | B1 | 7/2001 | Schumann et al. |
| 6,283,886 | B1 | 9/2001 | Schumann |
| 6,312,053 | B1 | 11/2001 | Magyar |
| 6,318,805 | B1 | 11/2001 | Asano |
| 6,325,458 | B1 | 12/2001 | Rohee et al. |
| 6,328,382 | B1 | 12/2001 | Yamashita |
| 6,328,383 | B2 | 12/2001 | Rohee et al. |
| 6,332,647 | B1 | 12/2001 | Yoshida et al. |
| 6,332,649 | B1 | 12/2001 | Vossmann |
| 6,338,532 | B1 | 1/2002 | Sugimoto |
| 6,364,413 | B1 | 4/2002 | Rohee et al. |
| 6,390,557 | B1 | 5/2002 | Asano |
| 6,402,249 | B1 | 6/2002 | Rohee et al. |
| 6,439,663 | B1 | 8/2002 | Ikegaya |
| 6,454,354 | B1 | 9/2002 | Vossmann et al. |
| 6,464,298 | B1 | 10/2002 | Hansel et al. |
| 6,474,740 | B1 | 11/2002 | Kondo et al. |
| 6,488,338 | B1 | 12/2002 | Hoshihara |
| 6,634,713 | B2 * | 10/2003 | Nonomiya et al. ......... 297/367 |
| 6,676,217 | B2 * | 1/2004 | Lange ................. 297/367 |
| 6,749,263 | B2 * | 6/2004 | Peters ................. 297/367 |
| 6,758,525 | B2 * | 7/2004 | Uramichi ................. 297/366 |
| 2001/0001220 | A1 | 5/2001 | Rohee et al. |
| 2002/0000746 | A1 | 1/2002 | Matsuura et al. |
| 2002/0017811 | A1 | 2/2002 | Cilliere et al. |
| 2002/0024246 | A1 | 2/2002 | Yamada et al. |
| 2002/0033627 | A1 | 3/2002 | Hoshihara et al. |
| 2002/0041119 | A1 | 4/2002 | Kojima et al. |
| 2002/0043852 | A1 | 4/2002 | Uramichi |
| 2002/0043855 | A1 | 4/2002 | Lange |
| 2002/0043856 | A1 | 4/2002 | Ikegaya |
| 2002/0050732 | A1 | 5/2002 | Koga et al. |
| 2002/0053825 | A1 | 5/2002 | Reubeuze et al. |
| 2002/0070596 | A1 | 6/2002 | Nonomiya et al. |
| 2002/0096922 | A1 | 7/2002 | Villaroel et al. |
| 2002/0096923 | A1 | 7/2002 | Uramichi |
| 2002/0096924 | A1 | 7/2002 | Reubeuze |
| 2002/0096925 | A1 | 7/2002 | Uramichi |

* cited by examiner

COMPACT RECLINER WITH LOCKING CAMS

FIELD OF THE INVENTION

The present invention relates to relates generally to a recliner mechanism and, more particularly, to a compact disc recliner mechanism for reducing undesirable movement when the mechanism is locked.

BACKGROUND OF THE INVENTION

Rotary recliner mechanisms generally include of a first rotary member having a plurality of teeth and a second rotary member including one or more pawls adapted to lockingly engage the teeth to couple the rotary members to one another. Typically, one rotary member is mounted to a quadrant for attachment to a seat back and the second rotary member is mounted to a base plate for attachment to a seat base. The rotary recliner mechanisms are operable to lock the rotary member connected to the seat back to restrict its rotation, or to release the rotary member connected to the seat back to allow it to rotate and to enable the seat back to recline.

The rotary recliner mechanism is selectively locked or released by manipulating the one or more pawls, which are mounted for rotation between an engaged position where the teeth of the pawl and the teeth of the rotary member connected to the seat base mesh, and a disengaged position where the pawl retracts and no longer meshes with the teeth of the rotary member connected to the seat base. Locking rotary recliner mechanisms also may include a device, such as a spring, for releasably urging the pawl from the disengaged to the engaged position so that the default position for the mechanism is a locked condition. Further, the rotary recliner typically includes an activating mechanism that moves the pawl from the engaged position to the disengaged position.

In reclining seats, the seat back functions as an extremely long lever arm against which various forces are applied. The locking rotary recliner mechanism in a vehicle seat is relatively small compared to the length of the reclining seat back, and vehicle vibration or movement of an occupant may impose various forces upon that lever during use. These forces impose a large moment about the rotary member connected to the seat back when applied along such a lengthy lever arm. If the forces are sufficient, or the rotary recliner mechanism is poorly designed, these forces can overcome the capability of the rotary recliner mechanism to anchor the seat back.

In addition, any imperfection in the components of the pivot mechanisms, such as play or backlash between the engaging teeth or tolerances between the mechanism components, may allow the rotary member connected to the seat back to move a miniscule amount even when the mechanism is locked. These small movements are magnified by the length of the lever arm and become noticeable at the upper end of the seat. For example, the seat back of an unoccupied seat may tend to oscillate when the vehicle encounters rough road conditions. Because the motion of the seat back is amplified by the length of the seat back frame, the vibration of the seat back can be relatively large. This magnified play in locking pivot mechanisms has been termed "chucking" and refers to any imperfections or play in the mechanism components that allow movement of the rotary member and attached seat back while the mechanism is in a locked condition.

One technique employed to reduce chucking is to form the components of the pivot mechanism with exceedingly close tolerances. This technique reduces play in the mechanism, and thus reduces chucking, but manufacturing to such close tolerance is expensive. Further, close tolerances may bind the components of the system and prevent smooth operation.

SUMMARY OF THE INVENTION

The present invention provides a compact recliner assembly including a first housing half and a second housing half rotatably supported about the first housing half. A pawl is movable between a first position engaging the second housing half to prohibit rotation relative to the first housing half and a second position disengaging the second housing half to enable rotation relative to the first housing half. A release cam is rotatably supported by the first housing half and engages the pawl to move the pawl between the first and second positions. A first locking cam engages the release cam and is movable between a locked position locking the pawl in the first position and an unlocked position enabling the pawl to move to the second position.

In one feature, a second locking cam engages the release cam and is movable between a lock position locking the pawl in the first position and an unlock position enabling the pawl to move to the second position.

In another feature, the release cam includes a cam slot engaging the pawl to direct the pawl between the first and second positions.

In still another feature, the release cam includes a cam surface slidably engaging the first locking cam to direct the first locking cam between the locked and unlocked positions.

In yet another feature, a biasing member biases the locking cam to urge the pawl into the first position and the first locking cam into the locked position.

In still another feature, when in the locked position an upper jamming surface of the first locking cam urges the pawl into the first position. Also, when in the locked position a lower jamming surface of the first locking cam abuts a locking wall of the second housing half.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
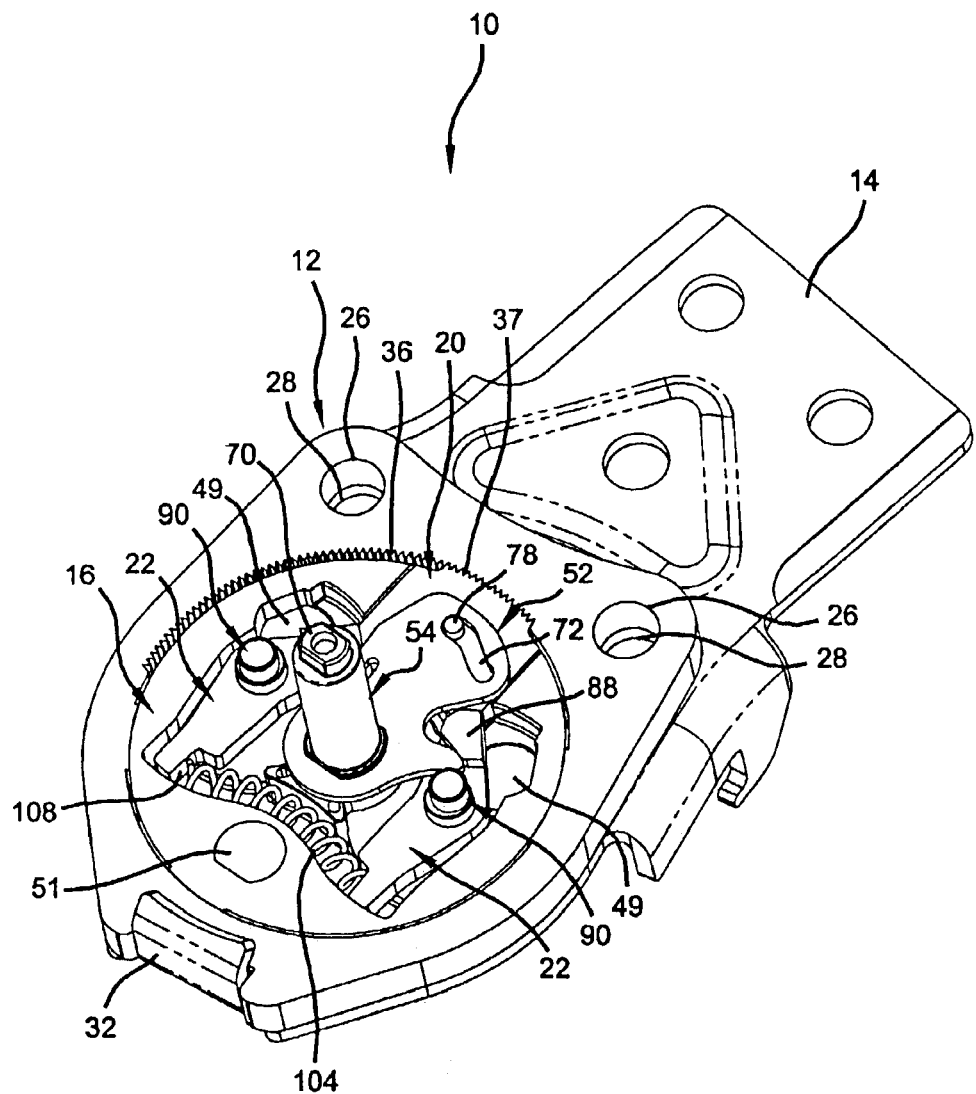
FIG. 1 is a perspective view of a compact recliner assembly according to the present invention.
Figure 2:
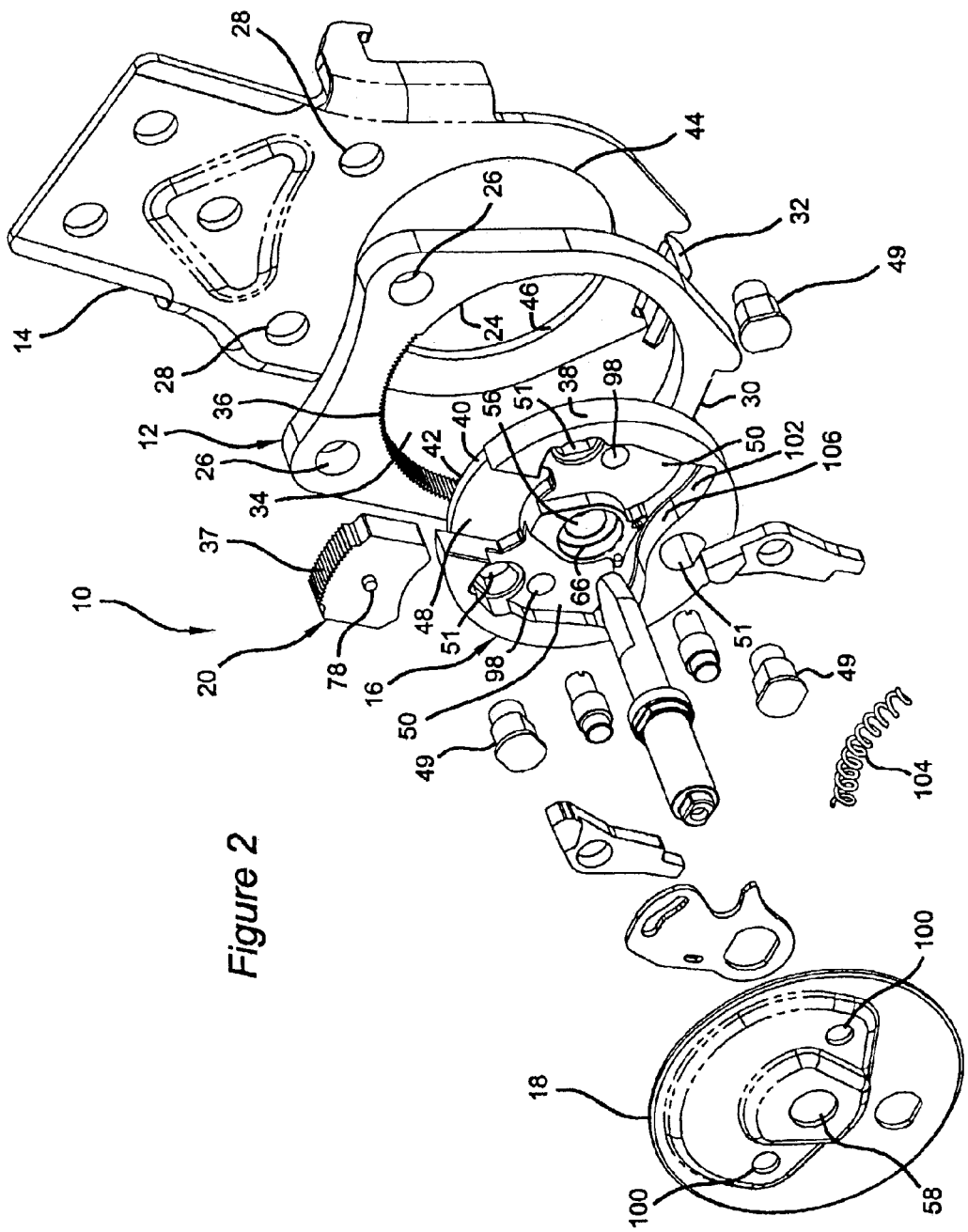
FIG. 2 is an exploded view of the compact recliner assembly.
Figure 3:
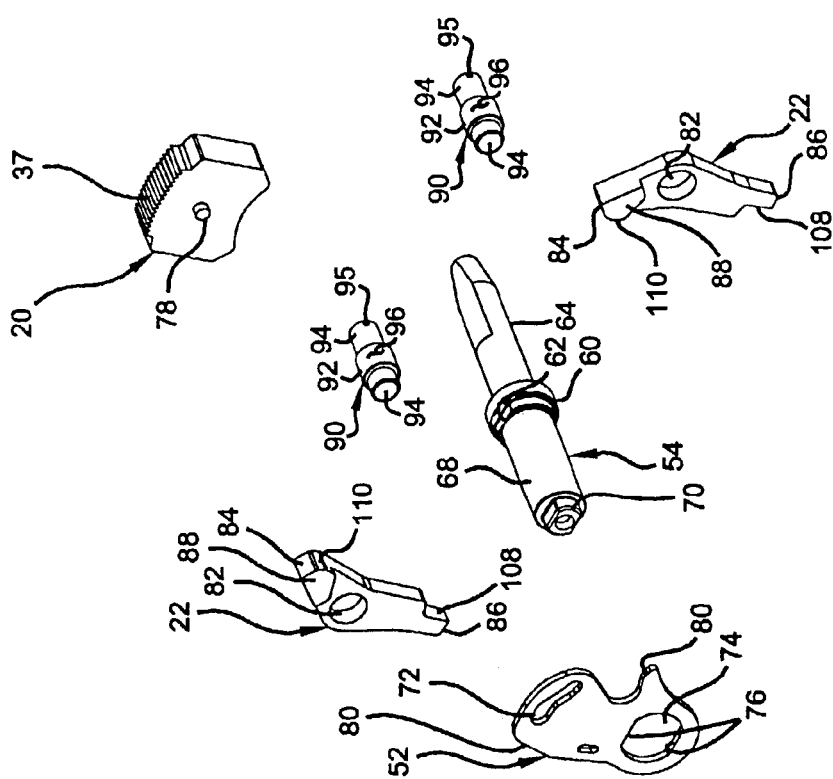
FIG. 3 is an exploded view of locking components of the compact recliner assembly.
Figure 4:
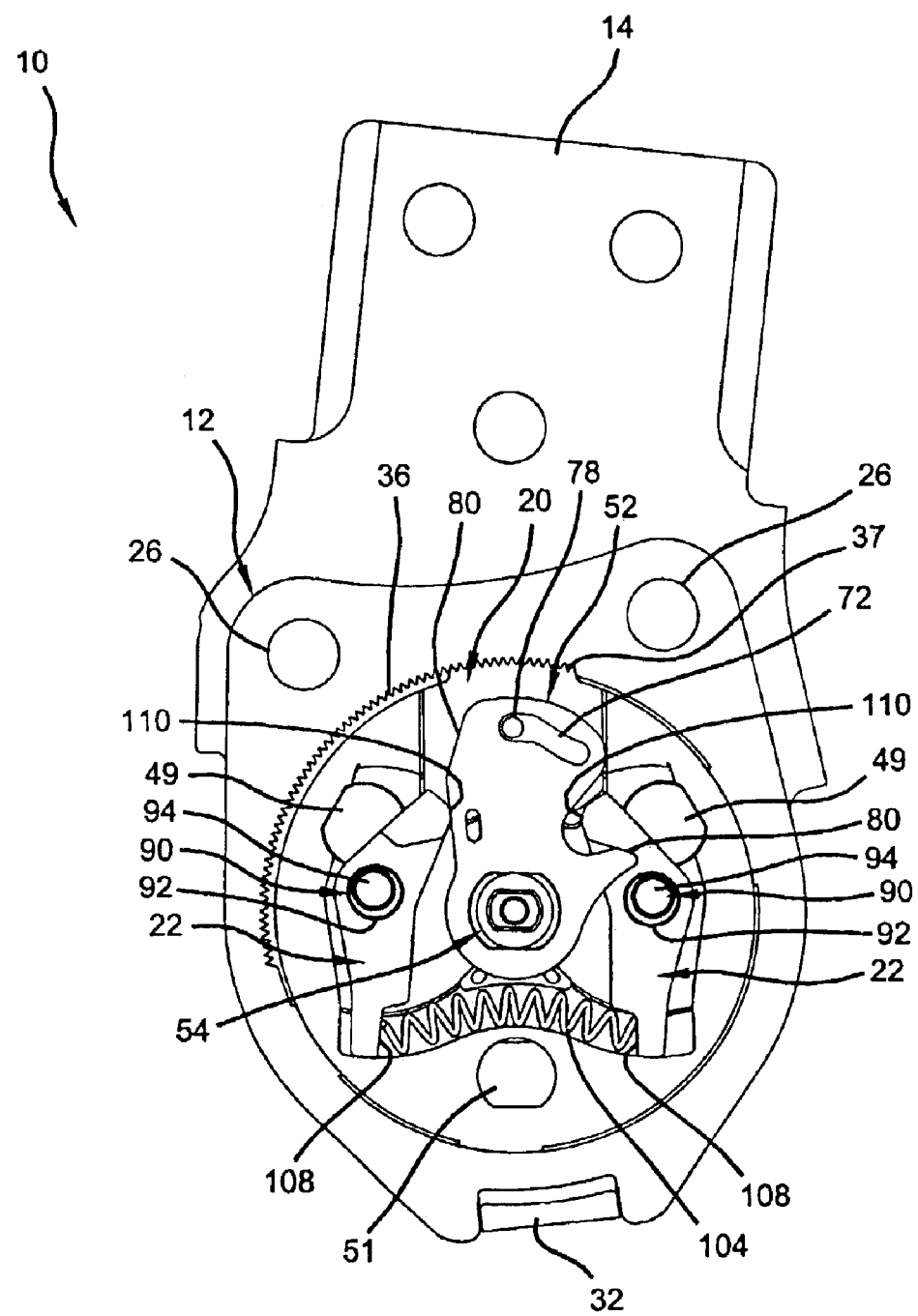
FIG. 4 is a plan view of the compact recliner assembly in a locked position.
Figure 5:
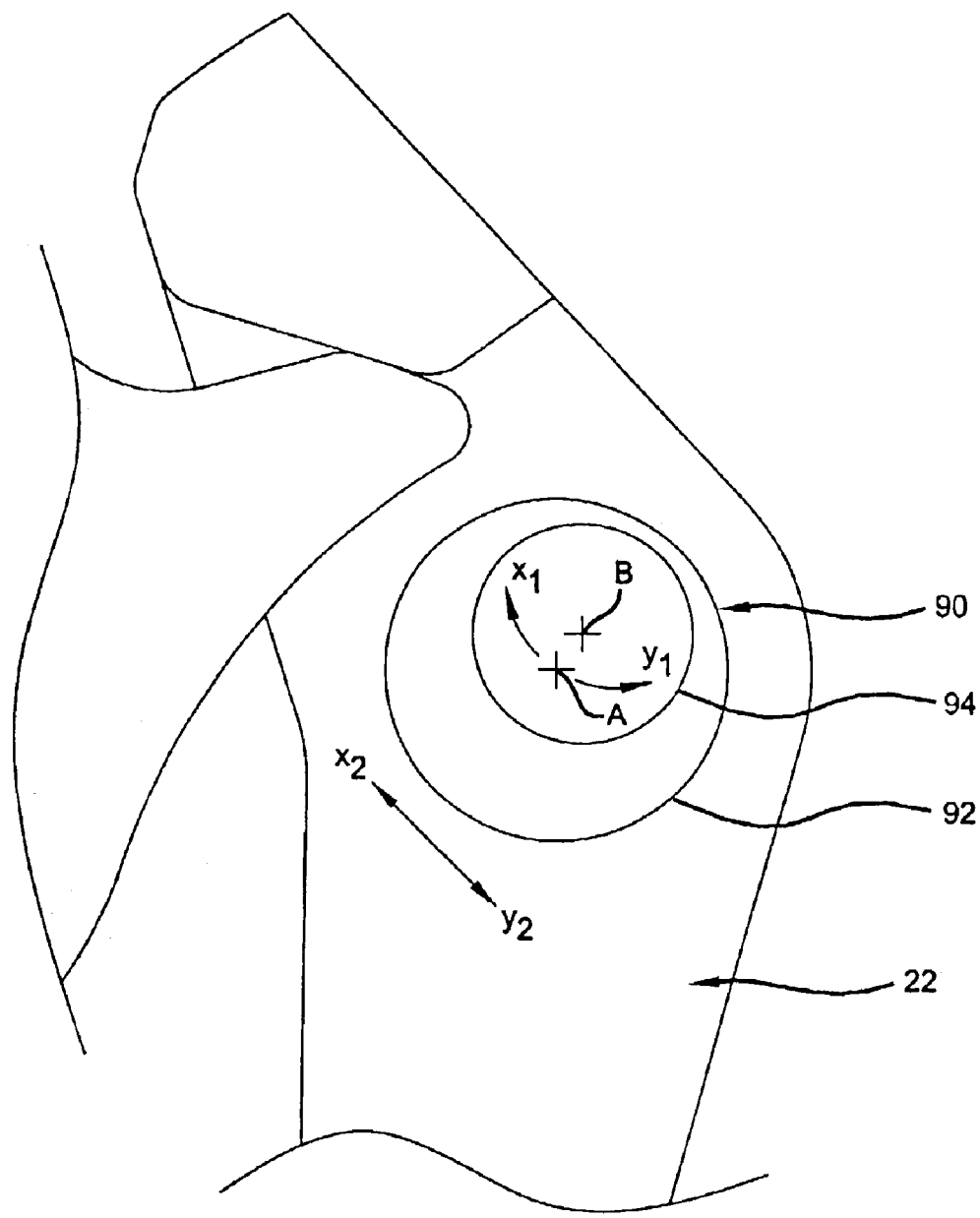
FIG. 5 is a detailed view of an adjustable pivot of the compact recliner assembly.

The following description of the preferred embodiments is merely exemplary in nature and is in no way intended to limit the invention, its application, or uses.

Referring to FIGS. 1 through 7, a compact recliner assembly 10 includes an outer housing 12 having a support plate 14 fixed thereto, and an inner housing 16 supported within the outer housing 12 and covered be a cover plate 18. The inner housing 16 supports a locking pawl 20 and a pair of locking cams 22. The locking pawl 20 is slidable between a locked position, engaging an inner circumferential surface 24 of the outer housing 12, and an unlocked position, disengaging the inner circumferential surface 24. The locking cams 22 are movable between locked and unlocked positions (see FIGS. 4 and 6, respectively) to correspondingly lock the locking pawl 20 in its locked position.

The outer housing 12 is fixed to the support plate 14 by fasteners (not shown) that are received through apertures 26 of the outer housing 12 and apertures 28 of the support plate 14. A lower flat 30 of the outer housing 12 seats within a bracket 32 extending from the support plate 14. The outer housing 12 includes an oversized aperture 34 that forms the inner circumferential surface 24. A series of teeth 36 are formed in a section of the inner circumferential surface 24. Teeth 37 of the locking pawl 20 selectively engage the teeth 36.

The inner housing 16 seats within the aperture 34 of the outer housing 12 and includes an outer circumferential surface 38. The outer circumferential surface 38 slidably engages the inner circumferential surface 24 of the outer housing. In this manner, the outer housing 12 is rotatably supported about the inner housing 16. The inner housing 16 also includes a cylindrical extension 40 that defines an outer circumferential surface 42. The cylindrical extension 40 is received into an aperture 44 of the support plate 14 that defines an inner circumferential surface 46. The outer circumferential surface 42 and the inner circumferential surface 46 are slidably engaged to support the support plate 14 about the inner housing 16. The inner housing 16 includes a pawl slot 48 and cam recesses 50 formed therein.

The inner housing 16 is anchored in a fixed position by anchors 49. The anchors 49 are received through apertures 51 and are secured to a fixed structure (not shown) by bolts (not shown). In this manner, the inner housing 16 is fixed relative to the support structure and the outer housing 12 is rotatable about the fixed inner housing 16.

A cam plate 52 is rotatably supported within the inner housing 16 and engages the locking pawl 20 and the locking cams 22 for moving each between the locked and unlocked positions. The cam plate 52 is supported about a pivot 54 that extends through a central aperture 56 of the inner housing 16 and a central aperture 58 of the cover plate 18. The pivot 54 includes a central cylindrical section 60 having a step with keyed surfaces 62. A tapered cylindrical section 64 extends through and is supported within the central aperture 56 of the inner housing 16. The central cylindrical section 60 seats within a recess 66 of the central aperture 56. A cylindrical section 68 extends through and is supported within the central aperture 58 of the cover plate 18. A keyed section 70 extends from an end of the cylindrical section 68.

The cam plate 52 includes a cam slot 72 and a central aperture 74 having keyed flats 76 formed therein. A post 78 of the locking pawl 20 is received into the cam slot 72 and is slidable therein. The pivot 54 is received through the central aperture 74, whereby the keyed surfaces 62 engage the keyed flats 76 of the central aperture 74. In this manner, the cam plate 52 is fixed for rotation with the pivot 54. The cam plate 52 further includes engagement edges 80 that slidably engage the locking cams 22.

The locking cams 22 include a central aperture 82, an upper jamming edge 84, a lower jamming edge 86, and a raised surface 88. The locking cams 22 are pivotally supported within the cam recesses 50 about pivots 90. The pivots 90 each include a central cylindrical section 92 defining an axis A and extending cylindrical sections 94 defining an axis B. As best seen in FIG. 4b, the central cylindrical section 92 is concentrically offset from the extending cylindrical sections 94. In other words, axis A is offset from axis B. A groove 95 is formed at an end of the extending cylindrical sections 94. The central cylindrical section 92 is received through the aperture 82 of the locking cam 22 and includes a bearing surface 96 about which the locking cam 22 is rotatably supported. The extending cylindrical sections 94 are received through apertures 98, 100 of the inner housing 16 and cover plate 18, respectively, to support the pivot 90 therebetween.

In the locked position the locking cams 22 act as columns biasing the locking pawl 20 into engagement with the inner circumferential surface 24. The upper jamming edges 84 of the locking cams 22 engage the locking pawl 20 and the lower jamming edges 86 engage a surface 102 of the inner housing 16. In this manner, the locking cams 22 prohibit inward radial sliding of the locking pawl 20. In the unlocked position the locking cams 22 are dislocated from engagement with the locking pawls 20 and surface 102 to enable the inward radial sliding of the locking pawl 20.

During assembly, tolerances between the locking cams 22 are minimized to ensure the locking cams 22 properly contact the locking pawl 20 and the surface 102 when in the locked position. To minimize tolerances, the relative positions of the locking cams 22 between the locking pawl 20 and the surface 102 are adjusted by rotating the pivots 90 within the apertures 98, 100. Rotation of the pivots 90 is induced inserting a flat-head tool (e.g. screwdriver) into the grooves 95. Rotation of the pivots 90 within the apertures 98, 100 induces the axis A to orbit axis B in directions $X_1$ or $Y_1$. The central cylindrical sections 92 rotate within apertures 82 of the locking cams 22. Movement of axis B about axis A induces planar movement of the locking cams 22 within the inner housing 16. The locking cams 22 move in directions $X_2$ and $Y_2$ to adjust the locking cams 22 between the locking pawl 20 and the surface 102. Once the desired adjustment of the locking cams 22 is achieved, the pivots 90 are staked to the inner housing 16 and the cover plate 18. In this manner, the pivots 94 are fixed from rotating after assembly, thereby fixing the position of the locking cams 22 between the locking pawl 20 and the surface 102.

The locking cams 22 are biased into the locked position be a compression spring 104. The compression spring 104 seats within a spring recess 106 partially defined by the surface 102. The compression spring 104 seats between flats 108 of the locking cams 22 to exert a biasing force on the locking cams 22. The engagement edges 80 of the cam plate 52 slidably engage corresponding edges 110 of the raised surfaces 88. As the cam plate 52 is induced to rotate, the engagement edges 80 bias the locking cams 22 to rotate about the pivots 90 to the unlocked position. As the locking cams 22 rotate, the flats 108 compress the compression spring 104. Upon release of the cam plate 52, the compression spring 104 biases the locking cams 22 into the locked position. As the locking cams 22 rotate back to the locked position the cam plate 52 is induced to rotate, urging the locking pawl 20 back into engagement with the teeth 36 of the inner circumferential surface 24.

Figure 6:
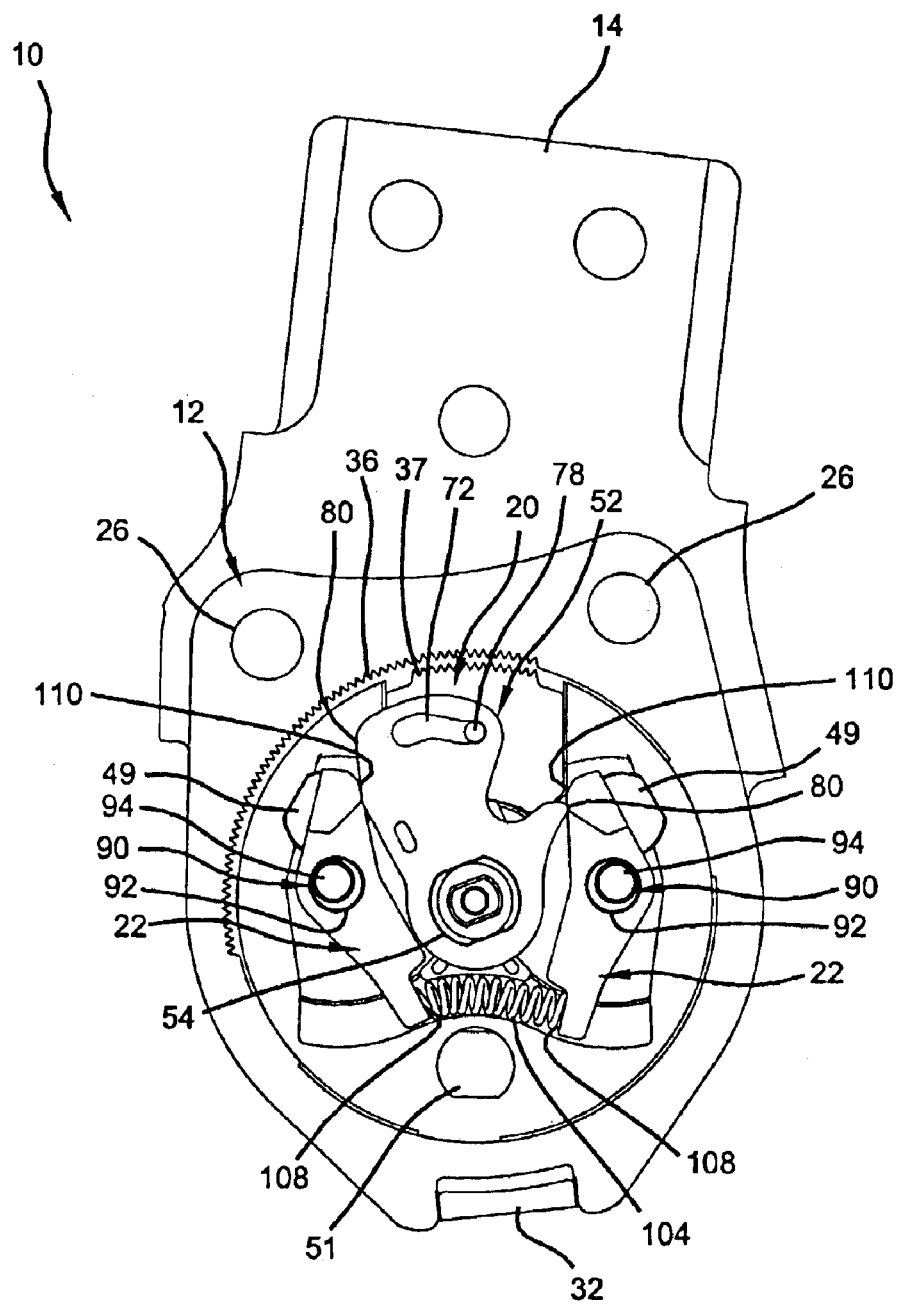
FIG. 6 is a plan view of the compact recliner assembly in an unlocked position.
Figure 7:
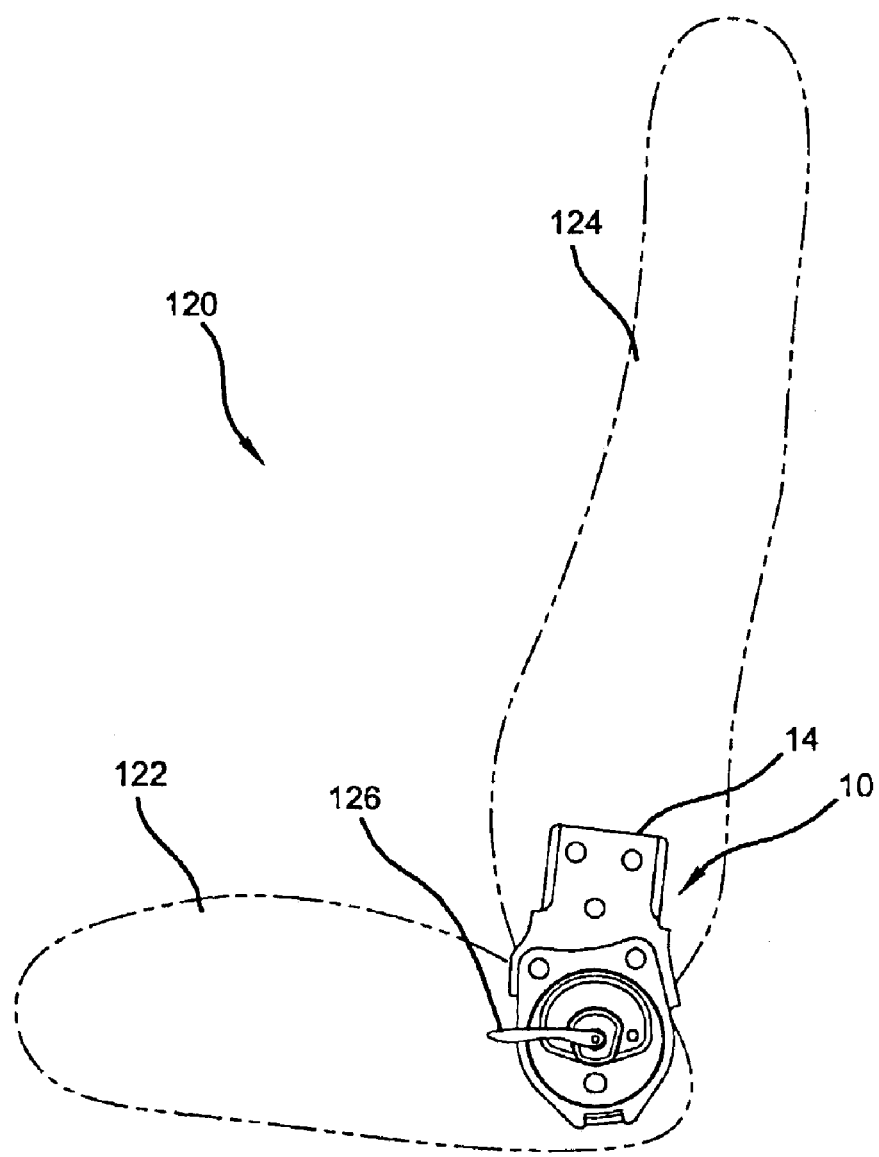
FIG. 7 is a schematic view of a seat incorporating the compact recliner assembly.

Referring now to FIG. 6, the compact recliner assembly 10 is integrated into a seat assembly 120. The seat assembly 120 includes a seat 122 and a seat back 124. The inner housing 16 is fixed to the seat 122 bu the anchors 49. The seat back 124 is fixed to the support plate 14. Rotation of the outer housing 12 about the inner housing 16 facilitates corresponding pivoting of the seat back 124 relative to the seat 122. A handle 126 is fixed to the keyed section 70 of the pivot 54. The handle 126 is actuated by an operator to induce rotation of the pivot 54, thereby facilitating operation of the compact recliner assembly 10 as described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A compact recliner assembly comprising:
   an outer housing;
   an inner housing rotatably supported by said outer housing;
   a pawl supported by said inner housing portion and operable between a first position and a second position, said pawl engaging said outer housing in said first position to prohibit rotation relative to said inner housing, said pawl disengaging from said outer housing in said second position to enable rotation relative to said inner housing;
   a release cam engaging said pawl and operable to move said pawl between said first and second positions; and
   first and second locking cams interacting with said release cam and operable to move between a locked position locking said pawl in said first position and an unlocked position enabling said pawl to move to said second position.

2. The compact recliner assembly of claim 1 further comprising a biasing member operable to bias said locking cam to urge said pawl into said first position and said first and second locking cams into said locked position.

3. The compact recliner assembly of claim 1 wherein in said locked position, an upper jamming surface of said first and second locking cams locks said pawl into said first position.

4. The compact recliner assembly of claim 1 wherein said release cam includes a cam slot engaging said pawl, said cam slot operable to direct said pawl between said first and second positions.

5. A compact recliner assembly comprising:
   an outer housing;
   an inner housing rotatably supported within said outer housing;
   a pawl supported by said inner housing portion and operable between a first position and a second position, said pawl engaging said outer housing in said first position to prohibit rotation relative to said inner housing, said pawl disengaging from said outer housing in said second position to enable rotation relative to said inner housing;
   a first locking cam interacting with said release cam and operable to move between a locked position locking said pawl in said first position and an unlocked position enabling said pawl to move to said second position; and
   a release cam operable to move said pawl between said first and second positions, including a cam surface slidably engaging said first locking cam, and operable to direct said first locking cam between said locked and unlocked positions.

6. The compact recliner assembly of claim 5 further comprising a biasing member operable to bias said locking cam to urge said pawl into said first position and said first locking cam into said locked position.

7. The compact recliner assembly of claim 5 wherein in said locked position, an upper jamming surface of said first locking cam locks said pawl into said first position.

8. The compact recliner assembly of claim 5 wherein in said locked position, a lower jamming surface of said first locking cam abuts a locking wall of said inner housing.

9. The compact recliner assembly of claim 5 further comprising a second locking cam interacting with said release cam and operable to move between a locked position locking said pawl in said first position and an unlocked position enabling said pawl to move to said second position.

10. A compact recliner assembly comprising:
    an outer housing including a locking wall;
    an inner housing rotatably supported by said outer housing;
    a pawl movable between a first position engaging said locking wall of said outer housing to prohibit rotation relative to said inner housing and a second position disengaging said outer housing to enable rotation relative to said inner housing;
    a release cam engaging said pawl to move said pawl between said first and second positions; and
    first and second locking cams interacting with said release cam and movable between a locked position wherein said first locking cam retains said pawl in said first position and an unlocked position enabling said pawl to move to said second position.

11. The compact recliner assembly of claim 10 wherein said release cam includes a cam slot engaging said pawl to direct said pawl between said first and second positions.

12. The compact recliner assembly of claim 10 wherein said release cam includes cam surfaces slidably engaging said first and second locking cams to direct said first and second locking cams between said locked and unlocked positions.

13. The compact recliner assembly of claim 10 further comprising a biasing member operable to bias said first and second locking cams to urge said pawl into said first position and said first locking cam into said locked position.

14. The compact recliner assembly of claim 10 wherein in said locked position jamming surfaces of said first and second locking cams abut said locking wall of said inner housing.

15. A compact recliner assembly comprising:
    an outer housing including a locking wall;
    an inner housing rotatably supported within said outer housing;
    a pawl movable between a first position engaging said locking wall of said outer housing to prohibit rotation relative to said inner housing and a second position disengaging said outer housing to enable rotation relative to said inner housing;
    a first locking cam and movable between a locked position wherein said first locking cam retains said pawl in said first position and an unlocked position enabling said pawl to move to said second position; and a release cam operable to move said pawl between said first and second positions and including cam surfaces slidably engaging said first locking cam to direct said first locking cam between said locked and unlocked positions.

16. The compact recliner assembly of claim 15 further comprising a biasing member operable to bias said first locking cam to urge said pawl into said first position and said first locking cam into said locked position.

17. The compact recliner assembly of claim 15 wherein in said locked position, jamming surfaces of said first locking cam abuts said locking wall of said inner housing.

18. The compact recliner assembly of claim 15 wherein said release cam includes a cam slot engaging said pawl to direct said pawl between said first and second positions.

19. The compact recliner assembly of claim 15 further comprising a second locking cam engaged with said release cam and operable to move between a locked position locking said pawl in said first position and an unlocked position enabling said pawl to move to said second position.

20. A reclining seat assembly including a seat and a seat back pivotal relative to said seat, comprising:
    a compact recliner assembly including:
        an inner housing fixed to said seat;
        an outer housing supporting said seat back and rotatably supported by said inner housing;
        a pawl supported by said inner housing and operable between a first position and a second position, said pawl engaging said outer housing in said first position to prohibit rotation relative to said inner housing, said pawl disengaging from said outer housing in said second position to enable rotation relative to said inner housing;
        a release cam engaging said pawl and operable to move said pawl between said first and second positions; and
        a first locking cam interacting with said release cam and operable to move between a locked position locking said pawl in said first position and an unlocked position enabling said pawl to move to said second position;
        a second locking cam engaged with said release cam and operable to move between a locked position locking said pawl in said first position and an unlocked position enabling said pawl to move to said second position; and
        a handle fixed for rotation with said release cam and actuable to move said pawl between said first and second positions.

21. The reclining seat assembly of claim 20 wherein said release cam includes a cam slot engaging said pawl, said cam slot operable to direct said pawl between said first and second positions.

22. The reclining seat assembly of claim 20 wherein said release cam includes a cam surface slidably engaging said first and second locking cams and operable to direct said first locking cam between said locked and unlocked positions.

23. The reclining seat assembly of claim 20 further comprising a biasing member operable to bias said locking cam to urge said pawl into said first position and said first and second locking cams into said locked position.

24. The reclining seat assembly of claim 20 wherein in said locked position, an upper jamming surface of said first and second locking cams lock said pawl into said first position.

25. The reclining seat assembly of claim 20 wherein in said locked position, a lower jamming surface of said first and second locking cams abut a locking wall of said inner housing.

26. A reclining seat assembly including a seat and a seat back pivotal relative to said seat, comprising:
    a compact recliner assembly including:
        an outer housing fixed to said seat;
        an inner housing supporting said seat back and rotatably supported within said outer housing;
        a pawl supported by said inner housing and operable between a first position and a second position, said pawl engaging said outer housing in said first position to prohibit rotation relative to said inner housing, said pawl disengaging from said outer housing in said second position to enable rotation relative to said inner housing;
        a first locking cam interacting with said release cam and operable to move between a locked position locking said pawl in said first position and an unlocked position enabling said pawl to move to said second position;
        a release cam operable to move said pawl between said first and second positions, including a cam surface slidably engaging said first locking cam, and operable to direct said first locking cam between said locked and unlocked positions; and
        a handle fixed for rotation with said release cam and actuable to move said pawl between said first and second positions.

27. The reclining seat assembly of claim 26 wherein said release cam includes a cam slot engaging said pawl, said cam slot operable to direct said pawl between said first and second positions.

28. The reclining seat assembly of claim 26 further comprising a biasing member operable to bias said locking cam to urge said pawl into said first position and said first locking cam into said locked position.

29. The reclining seat assembly of claim 26 wherein in said locked position, an upper jamming surface of said first locking cam locks said pawl into said first position.

30. The reclining seat assembly of claim 26 wherein in said locked position, a lower jamming surface of said first locking cam abuts a locking wall of said inner housing.

31. The reclining seat assembly of claim 26 further comprising a second locking cam engaged with said release cam and operable to move between a locked position locking said pawl in said first position and an unlocked position enabling said pawl to move to said second position.

32. A compact recliner assembly comprising:
    an inner housing;
    an outer housing receiving said inner housing and including a locking wall;
    a pawl supported on said inner housing, operable in a first position to engage said locking wall of said outer housing with said inner housing, and operable in a second position to disengage said locking wall of said outer first portion from said inner housing;
    a first locking cam in engagement with said pawl and pivotable to lock said pawl in engagement with said outer housing;
    a second locking cam operable to move between a locked position locking said pawl in said first position and an unlocked position enabling said pawl to move to said second position; and
    a release cam in engagement with said second locking cam and rotatable to pivot said second locking cam to unlock said pawl from engagement with outer housing.

33. The compact recliner assembly of claim 32 wherein said release cam includes a cam slot engaging said pawl, said cam slot operable to direct said pawl between said first and second positions.

34. The compact recliner assembly of claim 32 wherein said release cam includes a cam surface slidably engaging said first locking cam and operable to direct said first and second locking cam between said locked and unlocked positions.

35. The compact recliner assembly of claim 32 further comprising a biasing member operable to bias said first and second locking cams to urge said pawl into said first position and said first and second locking cams into said locked position.

36. The compact recliner assembly of claim 32 wherein in said locked position, an upper jamming surface of said first and second locking cam locks said pawl into said first position.

37. The compact recliner assembly of claim 32 wherein in said locked position, a lower jamming surface of said first and second locking cams abut a locking wall of said inner housing.

38. A compact recliner assembly comprising:
   an inner housing;
   an outer housing receiving said inner housing and including a locking wall;
   a pawl supported on said inner housing, operable in a first position to engage said locking wall of said outer housing with said inner housing, and operable in a second position to disengage said locking wall of said outer first portion from said inner housing;
   a first locking cam in engagement with said pawl and pivotable to lock said pawl in engagement with said outer housing; and
   a release cam including a cam surface slidably engaging said first locking cam in engagement with said locking cam, rotatable to pivot said locking cam to unlock said pawl from engagement with outer housing, and operable to direct said first locking cam between said locked and unlocked positions.

39. The compact recliner assembly of claim 38 wherein said release cam includes a cam slot engaging said pawl, said cam slot operable to direct said pawl between said first and second positions.

40. The compact recliner assembly of claim 38 wherein said release cam includes a cam surface slidably engaging said first locking cam and operable to direct said first locking cam between said locked and unlocked positions.

41. The compact recliner assembly of claim 38 further comprising a biasing member operable to bias said locking cam to urge said pawl into said first position and said first locking cam into said locked position.

42. The compact recliner assembly of claim 38 wherein in said locked position, an upper jamming surface of said first locking cam locks said pawl into said first position.

43. The compact recliner assembly of claim 38 wherein in said locked position, a lower jamming surface of said first locking cam abuts a locking wall of said inner housing.

44. The compact recliner assembly of claim 38 further comprising a second locking cam engaged with said release cam and operable to move between a locked position locking said pawl in said first position and an unlocked position enabling said pawl to move to said second position.

* * * * *